(12) United States Patent
Lester et al.

(10) Patent No.: US 7,264,841 B2
(45) Date of Patent: Sep. 4, 2007

(54) SAVORY GLUTEN-FREE FOODS

(76) Inventors: Linda Kalustian Lester, 147 Bronte St., San Francisco, CA (US) 94110; Eleanor Chicolo, 147 Bronte St., San Francisco, CA (US) 94110

( * ) Notice: Subject to any disclaimer, the term of this patent is extended or adjusted under 35 U.S.C. 154(b) by 608 days.

(21) Appl. No.: 10/762,098

(22) Filed: Jan. 21, 2004

(65) Prior Publication Data

US 2005/0158446 A1 Jul. 21, 2005

(51) Int. Cl.
*A23L 1/36* (2006.01)

(52) U.S. Cl. ............ 426/615; 426/459; 426/466; 426/500; 426/629; 426/638; 426/640

(58) Field of Classification Search ............ 426/615, 426/629, 638, 640, 459, 466, 500
See application file for complete search history.

(56) References Cited

U.S. PATENT DOCUMENTS

| 5,536,522 | A | 7/1996 | Seeds et al. |
| 6,013,294 | A | 1/2000 | Bunke et al. |
| 6,056,984 | A | 5/2000 | Ekanayake et al. |
| 6,613,366 | B1 | 9/2003 | Fitzpatrick |
| 2002/0165125 | A1 | 11/2002 | Merrill et al. |
| 2003/0203096 | A1 | 10/2003 | Hamm et al. |

FOREIGN PATENT DOCUMENTS

| WO | WO 00/30673 | 6/2000 |
| WO | WO 01/94629 | 12/2001 |

OTHER PUBLICATIONS

Hunter, B. The natural Foods Cookbook, Simon and Schuster, Inc. 1976, pp. 34, 35.*
Crook, W. et al. The Yeast Connection Cookbook, 1989, Professional Books, Inc., jackson, TN, pp. 125, 126, 185, 301.*
Abdulkarim, A.S. et al., "The diagnosis of celiac disease", *Ailment. Pharmacol. Ther.*, 17(8):987-995 (2003).
Chin, R.L. et al., Celiac Neuropathy, Neurology, 30(10):1581-1585 (2003).
Greer, R. "Easy Gluten-Free Cooking" *Thorsons*, London: 42-43 (2001).
Michael, M., "Recognizing and managing celiac disease in primary care", *J. Am. Acad. Nurse Pract.*, 15(3):108-114 (2003).
Tierney Jr., L.M. et al., *Current Medical Diagnosis & Treatment* 585-587 (2003).
http://www.glutenfreemall.com.
http://www.panix.com/~paleodiet/list/soups/htm.

* cited by examiner

*Primary Examiner*—Helen Pratt
(74) *Attorney, Agent, or Firm*—Wilson, Sonsini, Goodrich & Rosati; Albert P. Halluin; Peggy Radel

(57) ABSTRACT

The present invention discloses organic, gluten-free savory food products, including gluten-free pre-mixes, gluten-free broths, and gluten-free snack foods, as well as the methods for making them. The present invention provides tasteful alternatives for people sensitive to commercially available foods prepared with gluten-containing wheat flour.

27 Claims, No Drawings

SAVORY GLUTEN-FREE FOODS

FIELD OF INVENTION

The present invention relates to gluten-free savory food products and methods of making them. More specifically, the present invention relates to organic, gluten-free, savory snack foods and organic, gluten-free, pre-mixes and broths from which various foods can be made. The invention also describes a method of making a savory snack crisp.

BACKGROUND OF INVENTION

Gluten is a storage protein found in certain grains (e.g., wheat, barley, rye) and wheat variants (e.g., triticale, spelt, kamut) but not in others (e.g., oats, rice, corn). (L. M. Tierney, Jr., S. J. McPhee, and M. A. Papadakis, eds. (2003), Current Medical Diagnosis & Treatment: 585-587). Close to 15% of the total weight of a grain is comprised from gluten proteins. (U.S. 2002/0165125 A1).

A great deal of commercially available food contains gluten. People with malabsorption disorders suffer from a disruption of digestion and nutrient absorption. One such disorder is celiac disease.

Celiac disease (also known as gluten enteropathy or celiac sprue) is a disease in which inflammatory responses to the ingestion of gluten damage the proximal small intestinal mucosa and result in malabsorption of most nutrients. Gluten is hypothesized to stimulate an inappropriate T cell-mediated immune response in the intestinal submucosa that destroys mucosal enterocytes. (L. M. Tierney, Jr., S. J. McPhee, and M. A. Papadakis, eds. (2003), Current Medical Diagnosis & Treatment: 585-587). Characteristic symptoms of celiac disease include diarrhea, weight loss, abdominal distention, weakness, muscle wasting, growth retardation, and malnutrition. (L. M. Tierney, Jr., S. J. McPhee, and M. A. Papadakis, eds. (2003), Current Medical Diagnosis & Treatment: 585-587). Other symptoms that may occur even in the absence of the above symptoms, include fatigue, short statute, osteoporosis, dental enamel hypoplasia, and iron deficiency anemia. (L. M. Tierney, Jr., S. J. McPhee, and M. A. Papadakis, eds. (2003), Current Medical Diagnosis & Treatment: 585-587). Approximately 10% of celiac disease patients suffer neurological complications including ataxia and peripheral neuropathy. R. L. Chin, H. W. Sander, T. H. Brannagan, P. H. Green, A. P. Hays, A. Alaedini, N. Latov (2003), Celiac Neuropathy, Neurology, 60(10): 1581-1585). In addition, a cutaneous variant of celiac disease, dermatitis herpetiformis, exists. In this manifestation, patients suffer from a skin rash of pruritic papulovesicles over the extensor surfaces of the extremities, trunk, scalp, and neck. (L. M. Tierney, Jr., S. J. McPhee, and M. A. Papadakis, eds. (2003), Current Medical Diagnosis & Treatment: 585-587).

The prevalence of celiac disease in the United States is estimated to be 1:150 (M. Michael (2003), Recognizing and managing celiac disease in primary care, J. Am. Acad. Nurse Pract., 15(3): 108-114.), although whites of Northern European ancestry are afflicted at a higher rate than are those with African and Asian ancestry. (L. M. Tierney, Jr., S. J. McPhee, and M. A. Papadakis, eds. (2003), Current Medical Diagnosis & Treatment: 585-587).

To date, no medical treatment exists to eliminate the physiological response and consequent damage to intestinal mucosa following gluten ingestion. Thus, gluten sensitivities cannot be cured. Elimination of all gluten from the diet is essential. L. M. Tierney, Jr., S. J. McPhee, and M. A. Papadakis, eds. (2003), Current Medical Diagnosis & Treatment: 585-587). Thus, the only treatment available is compliance with a life-long gluten-free diet, which alleviates the symptoms of the disease and allows the intestinal mucosa to heal. (A. S. Abdulkarim and J. A. Murray (2003), The diagnosis of coeliac disease, Aliment. Pharmacol. Ther., 17(8): 987-95). Non-compliance with a gluten-free diet can result in recurrence of gastrointestinal symptoms, neuropathic symptoms, and/or other potentially life-threatening consequences.

Because of the widespread usage of gluten-containing grains in commercially available foods, people with gluten sensitivity are restricted in the foods available to them. One purpose of this invention is to provide organic, gluten-free alternatives to commercial food products containing gluten. Another purpose of this invention is to teach recipes for organic, gluten-free broths and pre-mixes which may be used as the base to create additional gluten-free food items.

Broths

Commercially available soups frequently include wheat flour or a gluten-containing wheat flour substitute as a thickening agent. Thus, individuals sensitive to gluten have few options for a tasty, yet safe-to-eat soup. In addition, a need exists for an organic gluten-free broth that can be used as a base for other gluten-free food items.

U.S. 2003/0203096 teaches a universal based sauce base with a bland and non-sour flavor which can be used in a wide variety of food applications. This sauce base, however, is not gluten-free.

A number of commercially available gluten-free products and recipes are available in stores and through the internet.

One recipe freely available on the internet provides instructions for a soup snack that instructs one to "[t]ake your fresh veg-any sort, any mixture-get lucky. Cook em (less than you would normally-steaming is best) add garlic (LOADS), extra virgin olive oil (LOADS), coconut oil (LOADS), fresh herbs, retain any liquid or add filtered water. Liquidase. Sprinkle fresh herbs, watercress, celery leaves, chopped radish, garlic, onions, ginger on top." (http://www.panix.com/~paleodiet/list/soups.htm). This recipe does not provide satisfactory information about the proportions of the ingredients, and as such does not enable a cook to reliably reproduce a tasty soup. In addition, the recipe does not restrict ingredients to gluten-free oils and vegetables. In addition, this soup retains solid vegetables within the broth rather than simmering vegetables to imbue the bouillon with the taste of vegetables.

Gluten-free bouillon cubes are commercially available (Celifibr Vegetable Medley Bouillon and Harvest Sun Low Sodium Vegetable Bouillon Cubes, both available at http://www.glutenfreemall.com). The Celifibr cubes contain organic vegetable and spice blends, sea salt, maltodextrin (from corn), molasses, yeast extract, and sunflower oil in dehydrated form. The Harvest Sun cubes contain yeast extract, organic potato starch, non-hydrogenated palm oil, organic vegetables, sea salt, and organic herbs in dehydrated http://www.glutenfreemall.com). The Celifibr cubes contain organic vegetable and spice blends, sea salt, maltodextrin (from corn), molasses, yeast extract, and sunflower oil in dehydrated form. The Harvest Sun cubes contain yeast extract, organic potato starch, non-hydrogenated palm oil, organic vegetables, sea salt, and organic herbs in dehydrated form. Both preparations require reconstitution before use. Thus, a need exists in the market for a freshly prepared organic, gluten-free bouillon preparation.

Pre-Mixes

Pre-mixes containing ingredients to easily and rapidly prepare food items and even meals are commercially available. A large number of these items contain wheat flour and are therefore unsuitable food choices for gluten-sensitive individuals.

U.S. Pat. No. 6,013,294 (Bunke et al.) and U.S. Pat. No. 6,056,984 (Ekanayake et al.) disclose shelf stable complete pre-mixes. These inventions require separate dry and aqueous components that are later mixed.

Thus, a need exists for an organic, gluten-free pre-mix that can be used as a base for the rapid preparation of healthy, gluten-free food items.

Snack Foods

Adults and children afflicted by gluten allergies or intolerance have few snack food choices. Most baked goods, and most non-sweet snack foods are made with gluten-containing flour. Thus, a need exists for tasty savory snack foods that can be safely consumed by those intolerant to gluten. Commercially available gluten-free snack foods tend to replace gluten-containing flour with substitute flours containing corn, soy, or other non-gluten-containing grains. One purpose of this invention is to teach a recipe for tasty, organic, gluten-free snacks that provide a healthy alternative to sugar-heavy snacks without gluten such as candy.

One commercially available recipe describes how to make golden crispbreads that are gluten-free. These crispbreads are potato-based baked chip-like food items, and are primarily non-gluten flour based. The recipe uses ground rice, corn flour (cornstarch), gram (chickpea) flour, salt, caster sugar, polyunsaturated margarine, fresh mashed potato, and water. (R. Greer (2001), Easy Gluten-Free Cooking, Thorsons, London: 42-43). The recipe does not provide vegetable nutrients or enable a cook to vary the savory flavoring of the snack.

The ingredients for another gluten-free recipe for crackers are disclosed in U.S. Pat. No. 6,613,366 B1 (Fitzpatrick) (citing E. Baker and E. Baker (1980), The Uncook Book, Communication Creativity, Saguache, Colo.). The millet cracker recipe discloses how to sprout millet and flaxseed before grinding and adding salt and poppy seeds. As noted in the '366 patent, however, no instructions are provided as to what to do after adding the salt and poppy seeds. In addition, the recipe discloses a seed based cracker, but does not teach how to incorporate fresh vegetables or other savories.

U.S. Pat. No. 5,536,522 (Seeds et al.) discloses a snack chip composition having a peak flavor protein roux which involves caramelizing a flour or particulate vegetable source. These crackers are not, however, gluten-free.

Two brands of gluten-free crackers are commercially available at http://www.glutenfreemall.com. Glutano crackers (maize) are described as "delicious crispy crackers" containing maize starch, rice flour, soya flour, vegetable fat, sugar, salt, guar gum, yeast, and sodium carbonate. Nu-World Foods Amaranth Chili Lime Snackers contain amaranth flour, tapioca flour, evaporated cane juice, tomato powder, chili powder, paprika, onion powder, vegetable oil (cold pressed canola oil or sunflower oil), natural flavors, sea salt, citric acid, and calcium citrate. Both of these crackers are created using gluten-free wheat flour substitutes, and both contain preservatives. No gluten-free fresh vegetable crackers appear to be on the market.

All patents noted above are herein incorporated by reference.

SUMMARY OF INVENTION

The present invention is directed to a gluten-free pre-mix comprised of organic, gluten-free seeds, flakes, and spices. This pre-mix can be used to create gluten-free food items, preferably savory crisps.

The present invention is also directed to a gluten-free broth comprised of vegetables, oil, herbs, and water. Preferably, safflower oil is used as the oil, although other oils including organic olive oil are envisioned.

The present invention is also directed to a savory crisp composed of a gluten-free broth, a gluten-free pre-mix, organic oil, and various savories, including herbs and vegetables. Various savories and seasonings and tastes are envisioned for the savory crisp, including all types of cheese (preferably parmesan or pecorino romano), all seeds (preferably caraway, rye, or cumin), all types of vegetables (preferably tomato or pepper), and all types of spices or herbs (preferably garlic, sage, thyme, or oregano).

The present invention also envisions methods of making savory crisps.

DETAILED DESCRIPTION OF THE INVENTION

Definitions

"Broth" refers to a soup-like concoction made from water, oil, vegetables, and seasonings that can be consumed as is or used as a base for organic, gluten-free food preparations. Broth does not refer to cream-based or tomato-based soups, or to soups that require the use of meat bones.

"Crisp" refers to a grilled, snack-like food analogous to a potato chip, but made without potatoes.

"Organic" means of, relating to, yielding, or involving the use of food produced with the use of feed or fertilizer of plant or animal origin without employment of chemically formulated fertilizers, growth stimulants, antibiotics, or pesticides.

"Pre-mix" refers to a combination of fresh (and/or without preservatives) food ingredients that require the preparer to supply and/or add additional ingredients to have the necessary ingredients to form a food or beverage.

"Savory" refers to snack food additives having a non-sweet dominant flavor, such as salty, spicy, and/or cheesy. Examples of savory snack foods include potato chips, pretzels, cheese puffs, corn chips, tortilla chips, crackers and the like. The dominant flavors of these snack foods sharply contrast with the sweet dominant flavors of non-savory snacks such as cookies, doughnuts, and candies.

The Invention

The present invention is directed to a gluten-free pre-mix comprised of organic, gluten-free seeds, herbs, flakes, and spices. The pre-mix may contain a number of organic, gluten-free seeds and flakes including but not limited to poppy seeds, flax seeds, brown sesame seeds, black sesame seeds, sunflower seeds, caraway seeds, and quinoa flakes, and preferably poppy seeds, flax seeds, brown sesame seeds, black sesame seeds, sunflower seeds, and quinoa flakes together. The pre-mix also contains dry spices and herbs, including amaranth powder, black pepper, and sea salt, and preferably amaranth powder, black pepper, and sea salt. The seeds, flakes, and spices are thoroughly mixed to form the pre-mix. This pre-mix can be used to create gluten-free food items, preferably savory crisps as described in the examples below.

One aspect of the present invention is a gluten-free broth comprised of vegetables, oil, herbs, and water. Preferably, safflower oil is used as the oil, although other oils including organic olive oil are envisioned. All fresh, organic, gluten-free vegetables are contemplated, alone and in combination, although a combination of red onion, parsley, carrot, celery, and leek is the preferred vegetable mix. All herbs are contemplated, alone or in combination, although thyme and bay leaf are preferred. To make the broth, the ingredients are sautéed in oil until lightly browned. Filtered water is then added, and the broth is brought to a boil. The heat is then reduced and the broth is simmered until reduced by half. The broth is then cooled slightly and strained through cheesecloth.

The present invention is also directed to a savory crisp composed of a gluten-free broth, a gluten-free pre-mix, organic oil, and various savories, including herbs, spices, and vegetables. The preferred pre-mix is described below in Example 1. The preferred broth is described below in Example 2. All organic oils are contemplated, although safflower oil is preferred. Various savories, seasonings and tastes are envisioned for the savory crisp, including all types of cheese (preferably parmesan or romano), all organic seeds (preferably caraway, rye, or cumin), all organic vegetables (preferably tomato or pepper), and all spices or herbs (preferably garlic, sage, thyme, or oregano).

The present invention also envisions methods of making savory crisps. In the general embodiment of the savory crisps ("Original Crisps"), an organic oil, preferably safflower oil, is added to a gluten-free pre-mix, preferably the gluten-free mix described below in Example 2. Gluten-free broth, preferably the broth described above, is then slowly added until the mixture is crumbly and moist. The mixture is rolled out into a coil on a surface dusted with amaranth powder, and the coil is then cut into shaped slices (preferably round). These slices are then lightly dusted with amaranth powder and placed between sheets of plastic wrap. Each slice is then compressed manually or by machine until each slice is very thin. Slices are preferably pressed manually. Slices ("crisps") are then cooked until lightly browned on each side, on a pre-heated flat grill, preferably over low to medium heat. If a crisp begins to curl, the heat is quickly lowered, and a folded clean towel is used to press the crisp flat. Once removed from the grill, the crisps are cooled on a rack or plate.

In order to more clearly describe the nature of the present invention, specific examples are described below. These examples are provided solely by way of example, and are not intended to delineate the scope of the invention or limit the claims.

EXAMPLE 1

Organic Gluten-Free Pre-Mix

To prepare an organic gluten-free pre-mix, mix ¼ cup ground poppy seeds, ¼ cup ground flax seeds, ¼ cup ground black sesame seeds, ¼ cup quinoa flakes, ¼ cup whole brown sesame seeds, ½ cup plus 2 tablespoons ground brown sesame seeds, ½ cup plus 2 tablespoons ground sunflower seeds, 2 cups amaranth powder, ¼ teaspoons ground black pepper, and ¼ teaspoons sea salt.

EXAMPLE 2

Gluten-Free Broth

The following ingredients are needed to make approximately 6 cups of gluten-free broth: 8 ounces red onion, 4 ounces parsley with stems, 4 ounces carrots, ¾ ounce garlic, 3 celery stalks, 4 ounces leeks, 3 sprigs of fresh thyme, 1 small bay leaf, 1 tablespoon safflower or olive oil, and 12 cups filtered water. The oil is placed in a large pan and all of vegetables and spices are sauteed until lightly browned. The water is then added to the sauteed medley and the broth is brought to a boil. The heat is then reduced and the mixture is simmered until reduced by half. The broth is then cooled slightly and strained through cheesecloth.

EXAMPLE 3

Gluten-Free Original Crisps

Creation of approximately 5 to 6 ounces dry weight gluten-free Original Crisps requires 1 cup of gluten-free pre-mix, 2 teaspoons organic safflower oil, and approximately ⅛ to ¼ cup gluten-free broth.

The pre-mix is placed in a bowl and mixed lightly with the oil. The broth is then slowly added until the mixture becomes crumbly and moist. The consistency of the mixture is controlled by adding more or less broth to the mixture. The mixture, which should not be too sticky or too wet (i.e., the mixture will not stick to hands or to the working surface), is then formed into a ball. The ball is rolled out on a flat surface that has been lightly sprinkled with amaranth powder until the coil is approximately 1 inch in diameter. The coil is then cut into ¼ inch pieces and placed on a plate and covered with plastic wrap to preserve moistness.

Before cooking, a flat grill is preheated to low or medium heat. A piece of plastic wrap about 18 inches long is placed on a smooth dry work surface. The surface of the plastic is powdered with amaranth powder. Four pieces of dough spaced about 4 inches apart are placed on the powdered plastic sheet. A small amount of amaranth powder is then sprinkled on the top of the ¼ inch pieces of the mixture, after which a second piece of plastic wrap (approximately 18 inches long) is placed on top of the slices. Using a rolling pin or the back of a flat surfaced plate, the slices sandwiched between the plastic wrap are compressed until they are round, very thin, and even in thickness. The plastic wrap is then removed and each round is placed on the heated grill surface. Each round crisp is cooked until lightly browned on each side. If a crisp starts to curl, the heat is quickly lowered and the crisp is pressed flat with a folded clean towel. The crisps are placed on a rack or plate to cool.

EXAMPLE 4

Gluten-Free Roasted Garlic Crisps

Creation of approximately 5 to 6 ounces dry weight gluten-free Roasted Garlic Crisps requires 1 cup of gluten-free pre-mix, 1 tablespoon of fresh roasted organic garlic (mashed into smooth paste) or 2 teaspoons dry roasted garlic, 2 teaspoons organic safflower oil, and approximately ⅛ to ¼ cup gluten-free broth.

The dry ingredients are placed in a bowl and mixed lightly with the garlic paste and oil. The broth is then slowly added until the mixture becomes crumbly and moist. The consistency of the mixture is controlled by adding more or less broth to the mixture. The mixture, which should not be too sticky or too wet (i.e., the mixture will not stick to hands or to the working surface), is then formed into a ball. The mixture is then rolled out on a flat surface that has been lightly sprinkled with amaranth powder until the coil is approximately 1 inch in diameter. The coil is then cut into ¼ inch pieces and placed on a plate and covered with plastic wrap to preserve moistness.

Before cooking, a flat grill is preheated to low or medium heat. A piece of plastic wrap about 18 inches long is placed on a smooth dry work surface. The surface of the plastic is powdered with amaranth powder. Four pieces of dough spaced about 4 inches apart are placed on the powdered plastic sheet. A small amount of amaranth powder is then sprinkled on the top of the ¼ inch pieces of the mixture, after which a second piece of plastic wrap (approximately 18 inches long) is placed on top of the slices. Using a rolling pin or the back of a flat surfaced plate, the slices sandwiched between the plastic wrap are compressed until they are round, very thin, and even in thickness. The plastic wrap is then removed and each round is placed on the heated grill surface. Each round crisp is cooked until lightly browned on each side. If a crisp starts to curl, the heat is quickly lowered and the crisp is pressed flat with a folded clean towel. The crisps are placed on a rack or plate to cool.

EXAMPLE 5

Gluten-Free Parmesan & Cracked Pepper Crisps

Creation of approximately 5 to 6 ounces dry weight gluten-free Parmesan Crisps requires 1 cup of gluten-free pre-mix, 3 heaping tablespoons shredded parmesan cheese, ¼ teaspoon cracked pepper, 2 teaspoons organic safflower oil, and approximately ⅛ to ¼ cup gluten-free broth.

The dry ingredients and cheese are mixed lightly with the oil in a bowl. The broth is then slowly added until the mixture becomes crumbly and moist. The consistency of the mixture is controlled by adding more or less broth to the mixture. The mixture, which should not be too sticky or too wet (i.e., the mixture will not stick to hands or to the working surface), is then formed into a ball. The mixture is then rolled out on a flat surface that has been lightly sprinkled with amaranth powder until the coil is approximately 1 inch in diameter. The coil is then cut into ¼ inch pieces and placed on a plate and covered with plastic wrap to preserve moistness.

Before cooking, a flat grill is preheated to low or medium heat. A piece of plastic wrap about 18 inches long is placed on a smooth dry work surface. The surface of the plastic is powdered with amaranth powder. Four pieces of dough spaced about 4 inches apart are placed on the powdered plastic sheet. A small amount of amaranth powder is then sprinkled on the top of the ¼ inch pieces of the mixture, after which a second piece of plastic wrap (approximately 18 inches long) is placed on top of the slices. Using a rolling pin or the back of a flat surfaced plate, the slices sandwiched between the plastic wrap are compressed until they are round, very thin, and even in thickness. The plastic wrap is then removed and each round is placed on the heated grill surface. Each round crisp is cooked until lightly browned on each side. If a crisp starts to curl, the heat is quickly lowered and the crisp is pressed flat with a folded clean towel. The crisps are placed on a rack or plate to cool.

EXAMPLE 6

Gluten-Free Onion Crisps

Creation of approximately 5 to 6 ounces dry weight gluten-free Onion Crisps requires 1 cup of gluten-free pre-mix, 2 teaspoons organic onion granules, 2 teaspoons organic safflower oil, and approximately ⅛ to ¼ cup gluten-free broth.

The dry ingredients and onion granules are mixed lightly with the oil in a bowl. The broth is then slowly added until the mixture becomes crumbly and moist. The consistency of the mixture is controlled by adding more or less broth to the mixture. The mixture, which should not be too sticky or too wet (i.e., the mixture will not stick to hands or to the working surface), is then formed into a ball. The mixture is then rolled out on a flat surface that has been lightly sprinkled with amaranth powder until the coil is approximately 1 inch in diameter. The coil is then cut into ¼ inch pieces and placed on a plate and covered with plastic wrap to preserve moistness.

Before cooking, a flat grill is preheated to low or medium heat. A piece of plastic wrap about 18 inches long is placed on a smooth dry work surface. The surface of the plastic is powdered with amaranth powder. Four pieces of dough spaced about 4 inches apart are placed on the powdered plastic sheet. A small amount of amaranth powder is then sprinkled on the top of the ¼ inch pieces of the mixture, after which a second piece of plastic wrap (approximately 18 inches long) is placed on top of the slices. Using a rolling pin or the back of a flat surfaced plate, the slices sandwiched between the plastic wrap are compressed until they are round, very thin, and even in thickness. The plastic wrap is then removed and each round is placed on the heated grill surface. Each round crisp is cooked until lightly browned on each side. If a crisp starts to curl, the heat is quickly lowered and the crisp is pressed flat with a folded clean towel. The crisps are placed on a rack or plate to cool.

EXAMPLE 7

Gluten-Free Herb Crisps

Creation of approximately 5 to 6 ounces dry weight gluten-free Herb Crisps requires 1 cup of gluten-free pre-mix, 1 tablespoon finely ground organic dry herbs (thyme, sage, oregano, and rosemary) 2 teaspoons organic safflower oil, and approximately ⅛ to ¼ cup gluten-free broth.

The dry ingredients and herbs are mixed lightly with the oil in a bowl. The broth is then slowly added until the mixture becomes crumbly and moist. The consistency of the mixture is controlled by adding more or less broth to the mixture. The mixture, which should not be too sticky or too wet (i.e., the mixture will not stick to hands or to the working surface), is then formed into a ball. The mixture is then rolled out on a flat surface that has been lightly sprinkled with amaranth powder until the coil is approximately 1 inch in diameter. The coil is then cut into ¼ inch pieces and placed on a plate and covered with plastic wrap to preserve moistness.

Before cooking, a flat grill is preheated to low or medium heat. A piece of plastic wrap about 18 inches long is placed on a smooth dry work surface. The surface of the plastic is powdered with amaranth powder. Four pieces of dough spaced about 4 inches apart are placed on the powdered plastic sheet. A small amount of amaranth powder is then sprinkled on the top of the ¼ inch pieces of the mixture, after which a second piece of plastic wrap (approximately 18 inches long) is placed on top of the slices. Using a rolling pin or the back of a flat surfaced plate, the slices sandwiched between the plastic wrap are compressed until they are round, very thin, and even in thickness. The plastic wrap is then removed and each round is placed on the heated grill surface. Each round crisp is cooked until lightly browned on each side. If a crisp starts to curl, the heat is quickly lowered and the crisp is pressed flat with a folded clean towel. The crisps are placed on a rack or plate to cool.

EXAMPLE 8

Gluten-Free Cumin Crisps

Creation of approximately 5 to 6 ounces dry weight gluten-free Cumin Crisps requires 1 cup of gluten-free pre-mix, 2 teaspoons cumin seeds, 2 teaspoons organic safflower oil, and approximately 1/8 to 1/4 cup gluten-free broth.

The dry ingredients and cumin seeds are mixed lightly with the oil in a bowl. The broth is then slowly added until the mixture becomes crumbly and moist. The consistency of the mixture is controlled by adding more or less broth to the mixture. The mixture, which should not be too sticky or too wet (i.e., the mixture will not stick to hands or to the working surface), is then formed into a ball. The mixture is then rolled out on a flat surface that has been lightly sprinkled with amaranth powder until the coil is approximately 1 inch in diameter. The coil is then cut into 1/4 inch pieces and placed on a plate and covered with plastic wrap to preserve moistness.

Before cooking, a flat grill is preheated to low or medium heat. A piece of plastic wrap about 18 inches long is placed on a smooth dry work surface. The surface of the plastic is powdered with amaranth powder. Four pieces of dough spaced about 4 inches apart are placed on the powdered plastic sheet. A small amount of amaranth powder is then sprinkled on the top of the 1/4 inch pieces of the mixture, after which a second piece of plastic wrap (approximately 18 inches long) is placed on top of the slices. Using a rolling pin or the back of a flat surfaced plate, the slices sandwiched between the plastic wrap are compressed until they are round, very thin, and even in thickness. The plastic wrap is then removed and each round is placed on the heated grill surface. Each round crisp is cooked until lightly browned on each side. If a crisp starts to curl, the heat is quickly lowered and the crisp is pressed flat with a folded clean towel. The crisps are placed on a rack or plate to cool.

EXAMPLE 9

Gluten-Free Caraway Crisps

Creation of approximately 5 to 6 ounces dry weight gluten-free Caraway Crisps requires 1 cup of gluten-free pre-mix, 1 tablespoon caraway seeds, 2 teaspoons organic safflower oil, and approximately 1/8 to 1/4 cup gluten-free broth.

The dry ingredients and caraway seeds are mixed lightly with the oil in a bowl. The broth is then slowly added until the mixture becomes crumbly and moist. The consistency of the mixture is controlled by adding more or less broth to the mixture. The mixture, which should not be too sticky or too wet (i.e., the mixture will not stick to hands or to the working surface), is then formed into a ball. The mixture is then rolled out on a flat surface that has been lightly sprinkled with amaranth powder until the coil is approximately 1 inch in diameter. The coil is then cut into 1/4 inch pieces and placed on a plate and covered with plastic wrap to preserve moistness.

Before cooking, a flat grill is preheated to low or medium heat. A piece of plastic wrap about 18 inches long is placed on a smooth dry work surface. The surface of the plastic is powdered with amaranth powder. Four pieces of dough spaced about 4 inches apart are placed on the powdered plastic sheet. A small amount of amaranth powder is then sprinkled on the top of the 1/4 inch pieces of the mixture, after which a second piece of plastic wrap (approximately 18 inches long) is placed on top of the slices. Using a rolling pin or the back of a flat surfaced plate, the slices sandwiched between the plastic wrap are compressed until they are round, very thin, and even in thickness. The plastic wrap is then removed and each round is placed on the heated grill surface. Each round crisp is cooked until lightly browned on each side. If a crisp starts to curl, the heat is quickly lowered and the crisp is pressed flat with a folded clean towel. The crisps are placed on a rack or plate to cool.

EXAMPLE 10

Gluten-Free Salsa "LOLA" CRISPS

Creation of approximately 5 to 6 ounces dry weight gluten-free Salsa "Lola" Crisps requires 1 cup of gluten-free pre-mix, 4 tablespoons plus 2 teaspoons finely ground dehydrated tomato, 1/2 teaspoon garlic powder, 1/2 teaspoon finely ground dried jalapeno, 1 teaspoon onion powder, 1/2 teaspoon sea salt, 4 tablespoons finely minced cilantro, 1 tablespoon lemon juice, 2 teaspoons organic safflower oil, and approximately 1/8 to 1/4 cup gluten-free broth.

The wet and dry ingredients are mixed lightly with the oil in a bowl. The broth is then slowly added until the mixture becomes crumbly and moist. The consistency of the mixture is controlled by adding more or less broth to the mixture. The mixture, which should not be too sticky or too wet (i.e., the mixture will not stick to hands or to the working surface), is then formed into a ball. The mixture is then rolled out on a flat surface that has been lightly sprinkled with amaranth powder until the coil is approximately 1 inch in diameter. The coil is then cut into 1/4 inch pieces and placed on a plate and covered with plastic wrap to preserve moistness.

Before cooking, a flat grill is preheated to low or medium heat. A piece of plastic wrap about 18 inches long is placed on a smooth dry work surface. The surface of the plastic is powdered with amaranth powder. Four pieces of dough spaced about 4 inches apart are placed on the powdered plastic sheet. A small amount of amaranth powder is then sprinkled on the top of the 1/4 inch pieces of the mixture, after which a second piece of plastic wrap (approximately 18 inches long) is placed on top of the slices. Using a rolling pin or the back of a flat surfaced plate, the slices sandwiched between the plastic wrap are compressed until they are round, very thin, and even in thickness. The plastic wrap is then removed and each round is placed on the heated grill surface. Each round crisp is cooked until lightly browned on each side. If a crisp starts to curl, the heat is quickly lowered and the crisp is pressed flat with a folded clean towel. The crisps are placed on a rack or plate to cool.

EXAMPLE 11

Gluten-Free Flavors or Italy Crisps

Creation of approximately 5 to 6 ounces dry weight gluten-free Flavors or Italy Crisps requires 1 cup of gluten-free pre-mix, 3 heaping tablespoons Pecorino Romano cheese, 5 tablespoons finely ground dehydrated tomato, 1 ½ tablespoons minced basil, 1 teaspoon fresh minced oregano, a pinch of ground chipotele, a pinch of jalapeno, 2 teaspoons organic safflower oil, and approximately ⅛ to ¼ cup gluten-free broth.

The dry ingredients are mixed lightly with the oil in a bowl. The broth is then slowly added until the mixture becomes crumbly and moist. The consistency of the mixture is controlled by adding more or less broth to the mixture. The mixture, which should not be too sticky or too wet (i.e., the mixture will not stick to hands or to the working surface), is then formed into a ball. The mixture is then rolled out on a flat surface that has been lightly sprinkled with amaranth powder until the coil is approximately 1 inch in diameter. The coil is then cut into ¼ inch pieces and placed on a plate and covered with plastic wrap to preserve moistness.

Before cooking, a flat grill is preheated to low or medium heat. A piece of plastic wrap about 18 inches long is placed on a smooth dry work surface. The surface of the plastic is powdered with amaranth powder. Four pieces of dough spaced about 4 inches apart are placed on the powdered plastic sheet. A small amount of amaranth powder is then sprinkled on the top of the ¼ inch pieces of the mixture, after which a second piece of plastic wrap (approximately 18 inches long) is placed on top of the slices. Using a rolling pin or the back of a flat surfaced plate, the slices sandwiched between the plastic wrap are compressed until they are round, very thin, and even in thickness. The plastic wrap is then removed and each round is placed on the heated grill surface. Each round crisp is cooked until lightly browned on each side. If a crisp starts to curl, the heat is quickly lowered and the crisp is pressed flat with a folded clean towel. The crisps are placed on a rack or plate to cool.

EXAMPLE 12

Gluten-Free Roasted Red Bell Pepper, Garlic & Basil Crisps

Creation of approximately 5 to 6 ounces dry weight gluten-free Roasted Red Bell Pepper, Garlic, & Basil Crisps requires 1 cup of gluten-free pre-mix, 4 tablespoons pureed roasted red pepper, 2 tablespoons minced fresh basil, ½ teaspoon roasted garlic, a pinch of sea salt, a pinch of ground black pepper, and 2 teaspoons safflower oil.

The garlic is roasted by taking a whole head of garlic and cutting the top off about ½ inch down. The garlic is placed in a piece of foil, drizzled with a small amount of organic olive oil, and cooked at 325° Fahrenheit for 40 minutes or until soft. The garlic is then removed from the oven and pureed.

The red pepper is roasted on an open fire until blackened on the outside. The pepper is removed from the heat and placed in a paper bag. After 5 minutes, the pepper is removed from the bag and the charred skin is peeled off the pepper. The pepper is de-seeded and the white membrane is removed from the inside of the pepper. The pepper is then pureed in a food processor or blender until smooth. The basil and roasted garlic are then added to the pureed red pepper.

The wet and dry ingredients are mixed lightly with the oil in a bowl. The consistency of the mixture is controlled by adding more or less of the pureed red pepper mixture to the other ingredients. The moisture within the pureed red pepper mixture should be sufficient moisture. If more moisture is needed, more of the pureed red pepper mixture is added. More pre-mix may be added if the mixture is too wet. The mixture, which should not be too sticky or too wet (i.e., the mixture will not stick to hands or to the working surface), is then formed into a ball. The mixture is then rolled out on a flat surface that has been lightly sprinkled with amaranth powder until the coil is approximately 1 inch in diameter. The coil is then cut into ¼ inch pieces and placed on a plate and covered with plastic wrap to preserve moistness.

Before cooking, a flat grill is preheated to low or medium heat. A piece of plastic wrap about 18 inches long is placed on a smooth dry work surface. The surface of the plastic is powdered with amaranth powder. Four pieces of dough spaced about 4 inches apart are placed on the powdered plastic sheet. A small amount of amaranth powder is then sprinkled on the top of the ¼ inch pieces of the mixture, after which a second piece of plastic wrap (approximately 18 inches long) is placed on top of the slices. Using a rolling pin or the back of a flat surfaced plate, the slices sandwiched between the plastic wrap are compressed until they are round, very thin, and even in thickness. The plastic wrap is then removed and each round is placed on the heated grill surface. Each round crisp is cooked until lightly browned on each side. If a crisp starts to curl, the heat is quickly lowered and the crisp is pressed flat with a folded clean towel. The crisps are placed on a rack or plate to cool.

The invention, and the manner and process of making and using it, are now described in such full, clear, concise and exact terms as to enable any person skilled in the art to which it pertains, to make and use the same. It is to be understood that the foregoing describes preferred embodiments of the present invention and that modifications may be made therein without departing from the scope of the present invention as set forth in the claims. To particularly point out and distinctly claim the subject matter regarded as invention, the following claims conclude the specification.

We claim:

1. A gluten-free crisp comprising a gluten-free premix comprising a mixture of gluten-free seeds, quinoa flakes and spices, an organic oil, and a gluten-free broth.

2. The gluten-free crisp of claim 1, wherein the organic oil is organic safflower oil.

3. The gluten-free crisp of claim 1, wherein the organic oil is organic olive oil.

4. The gluten-free crisp of claim 1, wherein the gluten-free pre-mix is organic.

5. The gluten-free crisp of claim 1, wherein the gluten-free broth is organic.

6. The gluten-free crisp of claim 1, wherein a savory is added.

7. The gluten-free crisp of claim 6, wherein said savory comprises cheese, herb, or spice.

8. The gluten-free crisp of claim 6, wherein said savory comprises garlic, cheese, onion, thyme, sage, marjoram, oregano, cumin, caraway, jalapeno, tomato, cilantro, basil, chipotele, or pepper.

9. The gluten-free crisp of claim 6, wherein said savory comprises garlic, parmesan cheese, onion, thyme, sage, marjoram, oregano, cumin, caraway, jalapeno, tomato, cilantro, basil, chipotele, pecorino romano cheese, cracked pepper, or red pepper.

10. The gluten-free crisp of claim 6, wherein the savory comprises one or all of rosemary, thyme, sage, oregano, and marjoram.

11. The gluten-free crisp of claim 6, wherein the savory is cumin seeds.

12. The gluten-free crisp of claim 6, wherein the savory is caraway seeds.

13. The gluten-free crisp of claim 6, wherein the savory comprises one or all of ground dehydrated tomato, garlic powder, ground dried jalapeno, onion powder, sea salt, cilantro and lemon juice.

14. The gluten-free crisp of claim 6, wherein the savory comprises pecorino romano cheese, ground dehydrated tomato, basil, chipotele, oregano, or jalapeno.

15. The gluten-free crisp of claim 6, wherein the savory comprises pureed roasted red pepper, roasted garlic, fresh basil, sea salt, or black pepper.

16. A method of making a gluten-free crisp comprising:
    mixing the gluten-free pre-mix of claim 9, with an organic oil, gluten-free broth, and any desired savory;
    forming the mixture into a ball;
    forming the ball into a coil lightly dusted with amaranth powder;
    cutting the coil into pieces;
    pressing each piece into thin evenly-sized slices; and
    cooking each slice on a heated grill until the crisp is lightly browned on each side.

17. The method of claim 16, wherein the rolling, pressing, and cooking are accomplished using a manual process.

18. The method of claim 16, wherein the rolling, pressing, and cooking are accomplished by a machine process.

19. The gluten-free pre-mix of claim 1, wherein the gluten-free pre-mix comprises a mixture of poppy seeds, flax seeds, sesame seeds, quinoa flakes, sunflower seeds, amaranth, pepper, and salt.

20. The gluten-free pre-mix of claim 1, wherein the gluten-free pre-mix comprises a mixture of ground poppy seeds, flax seeds, ground black sesame seeds, quinoa flakes, whole brown sesame seeds, ground brown sesame seeds, ground sunflower seeds, amaranth powder, ground black pepper, and sea salt.

21. The gluten-free broth of claim 1 further comprising fresh vegetables, herbs, organic oil and water.

22. The gluten-free broth of claim 21, wherein the organic oil is safflower oil.

23. The gluten-free broth of claim 21, wherein the organic oil is olive oil.

24. The gluten-free broth of claim 21 wherein the herbs comprise at least one of thyme and bay leaf.

25. The gluten-free broth of claim 21, wherein the gluten-free broth further comprises onion, parsley, carrot, garlic, celery, leek, and thyme.

26. The gluten-free broth of claim 24 wherein the onion is red onion.

27. The gluten-free broth of claim 24 wherein the broth has been strained.

* * * * *